US009916479B2

United States Patent
Jois et al.

(10) Patent No.: US 9,916,479 B2
(45) Date of Patent: Mar. 13, 2018

(54) USB DOCK SYSTEM AND METHOD FOR SECURELY CONNECTING A USB DEVICE TO A COMPUTING NETWORK

(71) Applicants: Lakshmi Krishna Jois, Bangalore Karnataka (IN); Ranjith Menon PV, Bangalore Karnataka (IN)

(72) Inventors: Lakshmi Krishna Jois, Bangalore Karnataka (IN); Ranjith Menon PV, Bangalore Karnataka (IN)

(73) Assignee: UNISYS CORPORATION, Blue Bell, PA (US)

( * ) Notice: Subject to any disclaimer, the term of this patent is extended or adjusted under 35 U.S.C. 154(b) by 174 days.

(21) Appl. No.: 14/868,486

(22) Filed: Sep. 29, 2015

(65) Prior Publication Data
US 2016/0328579 A1 Nov. 10, 2016

(51) Int. Cl.
*G06F 13/00* (2006.01)
*G06F 21/85* (2013.01)
*G06F 21/56* (2013.01)

(52) U.S. Cl.
CPC .............. *G06F 21/85* (2013.01); *G06F 21/56* (2013.01)

(58) Field of Classification Search
CPC .................................................. G07F 17/3237
See application file for complete search history.

(56) References Cited

U.S. PATENT DOCUMENTS

| 2010/0174913 A1* | 7/2010 | Johnson | G06F 21/34 713/186 |
| 2013/0007883 A1* | 1/2013 | Zaitsev | G06F 21/567 726/24 |
| 2014/0109240 A1* | 4/2014 | Pomerantz | G06F 21/60 726/27 |

* cited by examiner

Primary Examiner — Henry Tsai
Assistant Examiner — Juanito Borromeo

(57) ABSTRACT

A Universal Serial Bus (USB) dock for connecting a USB data storage device to a computing network. The USB dock includes a chassis for coupling the USB dock to the computing network, at least one panel coupled to the chassis, and at least one USB port coupled to at least one of the panels. The USB port indicates when a USB data storage device is connected to the USB port. The USB dock includes an operating system for booting the USB dock, for creating a table associated with the connected USB data storage device and for initiating an antivirus scan of the connected USB data storage device. If the antivirus scan detects a virus on the connected USB data storage device, an option of removing the virus from the connected USB data storage device is provided. If the detected virus is not removed from the connected USB data storage device, the USB port to which the USB data storage device is connected is disabled, thereby preventing the virus from entering the computing network. If the detected virus is removed from the connected USB data storage device, the operating system generates a token associated with the USB port to which the USB data storage device is connected. The token allows for enablement of the USB port to which the USB data storage device is connected. When the token expires, the USB port to which the USB data storage device is connected is disabled, thereby preventing enablement of the USB port to which the USB data storage device is connected.

22 Claims, 3 Drawing Sheets

USB DOCK SYSTEM AND METHOD FOR SECURELY CONNECTING A USB DEVICE TO A COMPUTING NETWORK

BACKGROUND

Field

The instant disclosure relates to computing networks, and in particular to securely connecting USB devices to computing networks.

Description of the Related Art

The security of a computing network within an organization is a major concern given the proliferation of computer viruses that, if introduced into the computing network, can severely harm and even disable the computing network. One of the easiest ways to introduce a computer virus into a computing network is by connecting to the computer network a Universal Serial Bus (USB) data storage device that has one or more computer viruses stored thereon. The innocent (or deliberate) connection of a USB device infected with a computer virus to an organization's computing network can trigger a virus breakout throughout the entire computing network.

Members of an organization typically connect USB data storage devices to the computing network of the organization to transfer data to and from the computing network. Such USB data storage devices include USB memory sticks, pen drives and external hard disk drives (HDDs). Although many USB devices are maintained securely to prevent computer viruses from infecting the USB devices, some USB devices are not properly or adequately maintained. Therefore, members of an organization can effectively become transponders of a computer virus onto the computing network of the organization due to poor maintenance of their personal USB devices. Also, USB devices that are used at an external location, e.g., a customer location, can inadvertently obtain a computer virus at the external location that is subsequently introduced to the computing network of the organization when the infected USB device is subsequently connected to the computing network of the organization.

Another solution to preventing computer viruses from being introduced to a computing network via a USB device involves scanning the USB device. Conventional scanning of USB device is not always successful in identifying computer viruses that may reside on a USB device. Also, the owner or user of a USB device can abort or postpone a scan of their USB device, e.g., out of negligence or convenience. Ultimately, the responsibility of scanning a possibly infected USB device lies with the owner or user of the USB device.

Another solution to preventing computer viruses from being introduced to a computing network via a USB device involves not allowing any USB devices to be connected to the computing network. However, prohibiting all USB devices from being connected to a computing network may not be a productive solution because such a blanket mandate might disrupt or prohibit computing network functions that require external storage connectivity.

SUMMARY

Disclosed is a Universal Serial Bus (USB) dock for connecting a USB data storage device to a computing network. The USB dock includes a chassis for coupling the USB dock to the computing network, at least one panel coupled to the chassis, and at least one USB port coupled to at least one of the panels. The USB port, which is configured to couple a USB data storage device to the USB dock, indicates when a USB data storage device is connected to the USB port. The USB dock also includes an operating system for booting the USB dock, for creating a table associated with a USB data storage device connected to the USB port and for initiating an antivirus scan of the USB data storage device connected to the USB port. If the antivirus scan detects a virus on the USB data storage device connected to the USB port, an option of removing the virus from the USB data storage device connected to the USB port is provided. If the detected virus is not removed from the USB data storage device, the USB port to which the USB data storage device is connected is disabled, thereby preventing the virus from entering the computing network. If the detected virus is removed from the USB data storage device, the operating system generates a token associated with the USB port to which the USB data storage device is connected. The token allows for enablement of the USB port to which the USB data storage device is connected. When the token expires, the USB port to which the USB data storage device is connected is disabled, thereby preventing enablement of the USB port to which the USB data storage device is connected.

DETAILED DESCRIPTION

Figure 1:
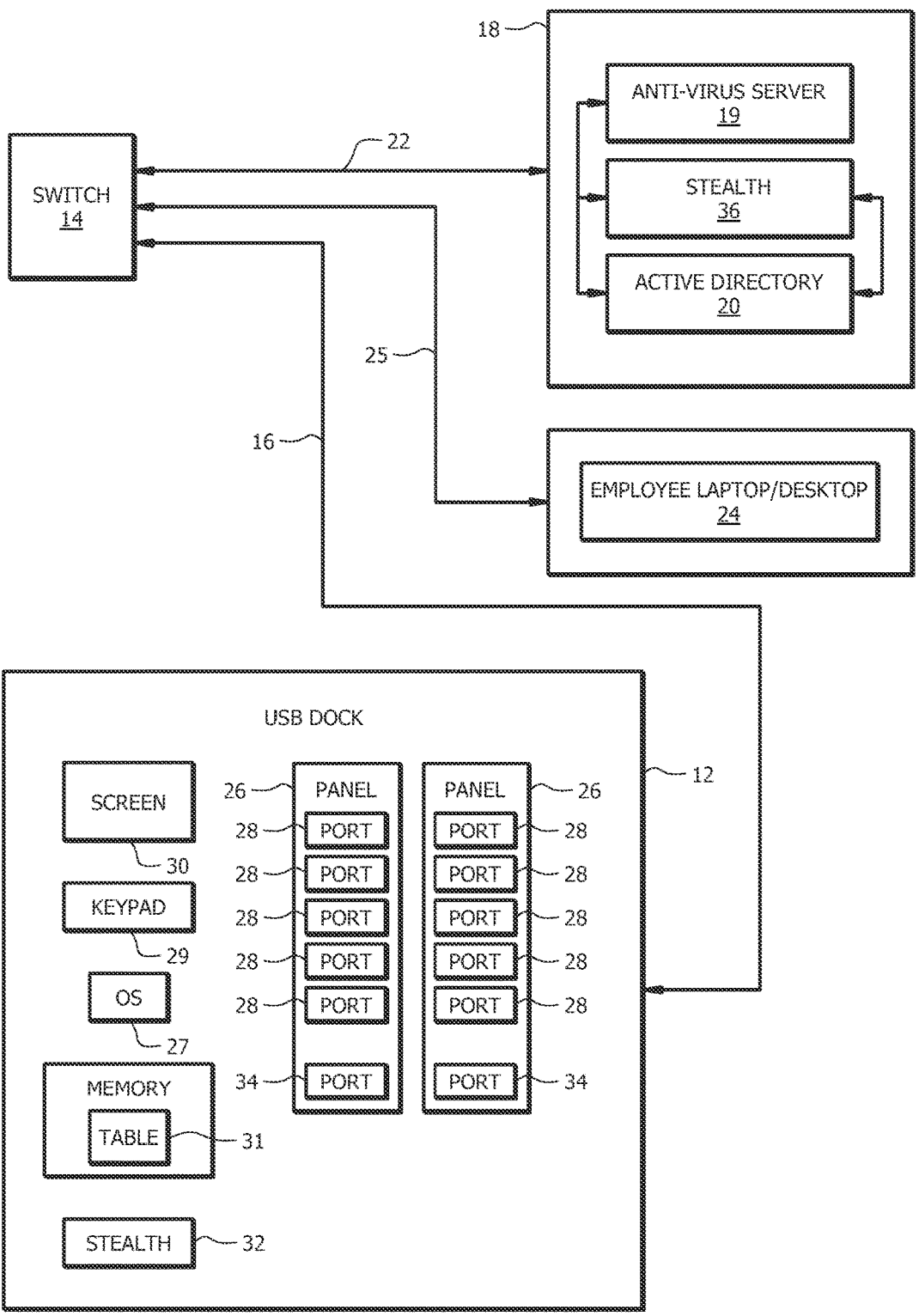
FIG. 1 is a schematic view of a system for securely connecting a USB device to a computing network, according to an embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

With the advent of Bring Your Own Device (BYOD) policies that allow members of an organization to connect their personal computing devices to the organization's computing network, it is inevitable that members of the organization will use data storage devices, such as Universal Serial Bus (USB) data storage devices, for porting or backing up data to and from the organization's computing network. Therefore, it is incumbent upon the organization to protect the organization's computing network from computer viruses that may reside on USB data storage devices that are connected to the organization's computing network.

There are many ways to protect a computer network infrastructure from Universal Serial Bus (USB) data storage devices that may have a computer virus thereon. One way is to automatically enable scanning of all USB data storage devices as soon as the USB device is connected to a computing device (e.g., a desktop or laptop computer) that is part of or can be part of the computer network. In this manner, as soon as the USB device is connected to the desktop or laptop computing device, one or more antivirus programs are automatically initiated and an antivirus scan of the USB device is automatically performed.

However, the downside to this approach is that the user of the USB device can intentionally cancel the antivirus scan once the antivirus scan has been initiated. Although it may be the policy of the organization for members of the organization not to cancel any automatic antivirus scans of USB devices connected to the organization's computing network, members of the organization may choose to cancel the automatic antivirus scan to avoid the time needed for the automatic antivirus scan to be performed.

Also, even if the automatic antivirus scan is not canceled, the antivirus program(s) on the desktop or laptop computing device may not be up to date. Therefore, an automatic scan of the connected USB device may not be successful in detecting and eliminating all computer viruses that may be stored on the USB device.

Another way to protect a computer network infrastructure from USB data storage devices that may have a computer virus thereon is to block all USB ports on the desktop or laptop computing device, and only allow for wireless data transmissions to and from the desktop or laptop computing device. However, this approach likely is impractical for members of an organization that rely on the use of USB data storage devices and their connections to the organization's computing network.

Another way to protect a computer network infrastructure from USB data storage devices that may have a computer virus thereon is to prohibit members of the organization from using USB devices, and to provide an organization-controlled mass data storage environment for the computing network. However, this approach can place unreasonable demands on the organization's information technology (IT) personnel and infrastructure resources, e.g., with respect to procurement, management and maintenance. Moreover, as the data storage demands of the organization and its computing network grow, so does the burden of procuring, managing and maintaining the organization's mass data storage environment for the computing network. Also, this approach does not foster or encourage the spirit of BYOD.

A viable alternative to the conventional approaches discussed hereinabove should provide an effective, controlled mechanism that scans for computer viruses on a USB data storage device, and cleans or quarantines infected USB devices at the device's point of entry to an organization's computing network. Also, the mechanism should fit in well with the existing, organized IT environment of the computing network, where users have designated access to IT assets and identification credentials are controlled through a centralized location.

FIG. 1 is a schematic view of a system 10 for securely connecting a USB device to a computing network, according to an embodiment. The system 10 includes a USB dock 12 and a switch 14. The USB dock 12 is coupled to the switch 14 via a network connection 16. The switch 14, which can be located in a data closet or switch room within the organization supporting the computing network, is suitable for coupling to a computing network or data center 18 of the organization via a network connection 22. The switch 14 also is suitable for coupling to one or more desktop or laptop computing devices 24 within the organization via a network connection 25.

The computing network 18, which can be any suitable computing network of an organization, can include an antivirus server 19, which is discussed in greater detail hereinbelow. The computing network 18 also can include an active directory 20, which is discussed in greater detail hereinbelow. Also, the computing network 18 can include one or more Stealth components or devices 36, which is discussed in greater detail hereinbelow.

The USB dock 12 is a chassis that has a plurality of individual panels 26, and each panel 26 has a plurality of USB ports 28. The USB dock 12 is a configurable device that includes the appropriate software, hardware and firmware to properly boot up the USB dock 12. The USB dock 12 also has a configurable operating system 27, such as a BSD (Berkeley Software Distribution) operating system. The BSD operating system includes a BSD kernel or core, which is responsible for many tasks, such as managing memory, enforcing security controls, networking and disk access. The configurable operating system 27 includes appropriate software that assists in creating a table of all USB devices connected to the USB dock 12, and also in generating tokens, as will be discussed in greater detail hereinbelow. The USB dock 12 also has embedded therein one or more appropriate antivirus programs, such as F-Prot or other suitable antivirus programs that may be used within the computing network 18.

The USB dock 12 includes an alphanumeric keypad 29 and a screen 30 to prompt the user for certain actions, as will be described in greater detail hereinbelow. The USB dock 12 is capable of being configured to receive IP (Internet Protocol) information from the computing network 18 through a DCHP (Dynamic Host Configuration Protocol), or the USB dock 12 can be configured as a static IP. Also, the USB dock 12 can include compatibility with one or more Stealth application components 32, as will be discussed in greater detail hereinbelow.

The USB dock 12 includes a management USB port 34, which can be a micro USB port and also a conventional 10/100/1000 mbps network port. The management USB port 34 allows the USB dock 12 to be coupled to the computing network 18 via the switch 14. Configuring the USB dock 12 can be performed by connecting the USB dock 12, using the management USB port 34, to the computing device 24. Once the USB dock 12 is connected to the computing device 24 using the management USB port 34, the USB dock 12 appears as a device on the computing device 24. When the device icon for the USB dock 12 is clicked on the computing device 24, an appropriate graphical user interface (GUI) is invoked and appears on the screen of the computing device 24. The USB dock 12 then can be configured using the GUI.

Each USB port 28 on the USB dock 12 has a hard coded unique identification number, which is learned by the operating system 27 of the USB dock 12 when the USB dock 12 is booted. When a USB device is connected to the USB dock 12, a message appears on the screen 30 indicating the size of the USB device and the USB port to which the USB device is connected. The screen 30 then can prompt the user for various information.

For example, the user can be asked if the USB device is to be formatted. If the user desires the USB device to be formatted, the screen 30 prompts the user for a volume label, which the user can enter via the keypad 29. The user then is asked for a domain user identification and password, which the user can enter via the keypad 29. If the user does not desire the USB device to be formatted, the screen 30 prompts the user for a domain user identification and password, which the user can enter via the keypad 29.

If the user enters an inappropriate or incorrect domain user identification and/or password, the USB dock 12 shuts down or disables the USB port 28 to which the USB device is connected. Once the user has entered an appropriate domain user identification and password, the user is asked if the user desires a Stealth application to be enabled. If the user desires a Stealth application to be enabled, the user responds by entering "Y" (yes). If the user does not desire to enable a Stealth application, the user responds by entering "N" (no).

Once the user has entered an appropriate domain user identification and password, and either enabled or not enabled a Stealth application, the USB dock 12 creates a USB mapping table 31 within a memory portion of the USB dock 12, cataloging various information about the USB device and the user. Such information can include the volume label, the serial number of the USB device, the domain identification of the user, and the USB port 28 to which the USB device is connected. The size of the USB mapping table 31 grows based on the number of USB devices that are connected to the USB dock 12. The size of the USB mapping table 31 can be limited to the number of USB ports 28 on the USB dock 12.

Once a user/USB device entry has been entered into the USB mapping table 31, the USB dock 12 initiates an antivirus scan of the USB device connected to the USB dock 12. During the antivirus scan, there are two possibilities. First, if a virus is found to exist on the connected USB device, the USB dock 12 generates a message to the user indicating that the user is logged on and that a virus has been detected on the USB device that the user connected to the USB dock 12. The message also can be sent to the appropriate location within the computing network 18, via the switch 14.

The USB dock 12 then asks the user if the user desires the detected virus to be cleaned from the connected USB device. If the user responds "Y" (yes), indicating that the user desires the detected virus to be cleaned from the connected USB device, the USB dock 12 initiates a process of cleaning the detected virus from the connected USB device. Once the detected virus has been cleaned from the connected USB device, the USB dock 12 initiates a token/certificate generating process, which is described hereinbelow.

If the virus can be cleaned from the connected USB device only by deleting one or more infected files on the connected USB device, the USB dock 12 generates a message to the user indicating that one or more infected files must be deleted from the connected USB device. The USB dock 12 also asks the user if the user desires the infected files to be deleted from the connected USB device. If the user responds "Y" (yes), indicating that the user desires the infected files to be deleted from the connected USB device, the USB dock 12 deletes the infected files from the connected USB device. On occasion, if a detected virus is a boot sector virus, the USB dock 112 generates a message asking the user to re-format the USB device. Once the infected files have been deleted from the connected USB device, the USB dock 12 initiates the token/certificate generating process, which is described hereinbelow.

If at any time during the antivirus detecting/cleaning/deleting process the user responds "N" (no), indicating that the user does not want the detected virus to be cleaned or the infected files to be deleted, the USB dock 12 generates a message to the user indicating that the connected USB device does not comply with organizational policy. The USB dock 12 then generates a message to the user asking the user to disconnect the USB device from the USB port 12. The USB dock 12 then shuts down or disables the port 28 to which the USB device is connected, thereby preventing the detected virus from entering the computing network 18.

The second possibility is that no virus is detected. If no virus is detected on the USB device connected to the USB dock 12, the USB dock 12 initiates a token/certificate generating process, as described hereinbelow.

Once the USB dock 12 has determined that the connected USB device is free of viruses, or has been cleaned/cleared of any detected viruses, the USB dock 12 generates a token or certificate that is associated with the connected USB device, and makes an appropriate entry into the USB mapping table 31. The generated token/certificate is provided to certify that the connected USB device is free from any viruses. The generated token/certificate is valid for a period of time, e.g., 24 hours. Once the token/certificate has expired, the USB dock 12 shuts down or disables the USB port 28 to which the USB device is connected.

Once the USB dock 12 has generated the token/certificate, the USB dock 12 sends a background request to the computing network 18, indicating the computing device 24 to which the user is logged on. The computing network 18 then establishes a new drive on the computing device 24 to which the user is logged on. The user sees a new window opened on the computing device 24. The user now is free to access the connected USB device through this window on the computing device 24.

When the user is finished using the connected USB, and disconnects the connected USB device from the USB dock 12, the USB dock 12 acknowledges that the USB device has been disconnected from the USB dock 12. The USB dock 12 then removes or invalidates the token/certificate associated with the disconnected USB device, and shuts down or disables the USB port 28 on the USB dock 12.

Figure 2:
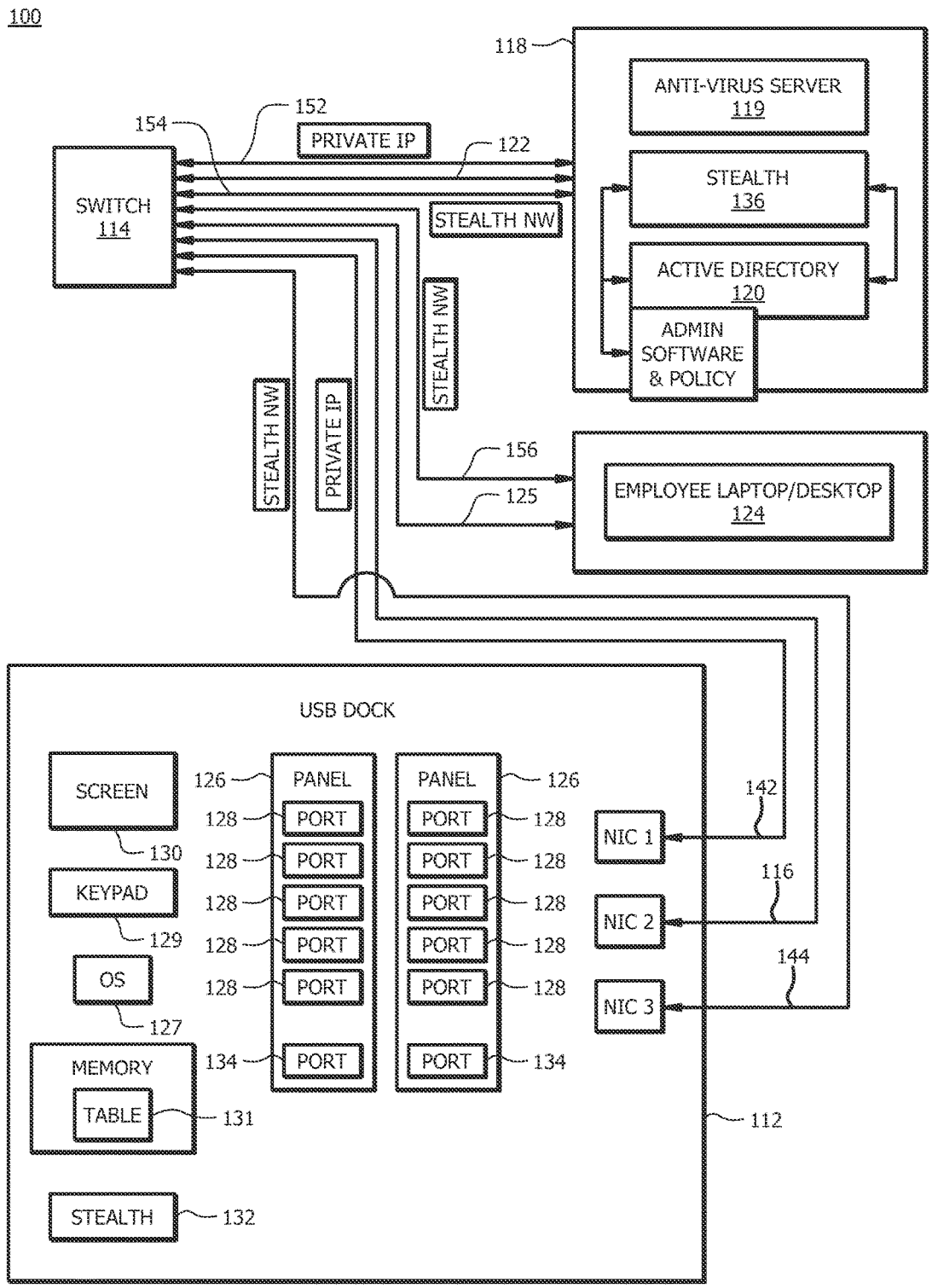
FIG. 2 is a schematic view of a system for securely connecting a USB device to a computing network, according to an alternative embodiment.

FIG. 2 is a schematic view of a system 100 for securely connecting a USB device to a computing network, according to an alternative embodiment. The system 100 includes a USB dock 112 and a switch 114. The USB dock 112 is coupled to the switch 114 via a network connection 116. The switch 114, which can be located in a data closet or switch room within the organization supporting the computing network, is suitable for coupling to a computing network or data center 118 of the organization via a network connection 122. The switch 114 also is suitable for coupling to one or more desktop or laptop computing devices 124 within the organization via a network connection 125.

As will be discussed in greater detail hereinbelow, the switch 114 also is suitable for coupling to the computing network or data center 118 of an organization via a private IP connection 152 and via a stealth network connection 154. Also, the switch 114 is suitable for coupling to the one or more desktop or laptop computing devices 124 via a stealth network connection 156.

The computing network 118, which can be any suitable computing network or data center of an organization, can include an antivirus server 119, which is discussed in greater detail hereinbelow. The computing network 118 also can include an active directory 120, which is discussed in greater detail hereinbelow. Also, the computing network 118 can include one or more Stealth components or devices 136, which is discussed in greater detail hereinbelow.

The USB dock 112 is a chassis that has a plurality of individual panels 126, and each panel 126 has a plurality of USB ports 128. The USB dock 112 is a configurable device that includes the appropriate software, hardware and firmware to properly boot up the USB dock 112. The USB dock 112 also has a configurable operating system 127, such as a BSD (Berkeley Software Distribution) operating system. The BSD operating system includes a BSD kernel or core, which is responsible for many tasks, such as managing memory, enforcing security controls, networking and disk access. The configurable operating system 127 includes appropriate software that assists in creating a USB mapping table 131 of all USB devices connected to the USB dock 112, and also in generating tokens, as will be discussed in greater detail hereinbelow. The USB dock 112 also has embedded therein one or more appropriate antivirus programs, such as F-Prot or other appropriate antivirus programs that may be used within the computing network 118.

The USB dock 112 also includes an alphanumeric keypad 129 and a screen 130 to prompt the user for certain actions, as will be described in greater detail hereinbelow. The USB dock 112 is capable of being configured to receive IP (Internet Protocol) information from the computing network 118 through a DCHP (Dynamic Host Configuration Protocol), or the USB dock 112 can be configured as a static IP. Also, the USB dock 112 can include compatibility with one or more Stealth application components 132, as will be discussed in greater detail hereinbelow.

The USB dock 12 includes one or more network interface cards (NICs), such as a first network interface card (NIC 1) that provides for a private network connection 142 to the switch 114, a second network interface card (NIC 2) that provides the public network connection 116 to the switch 114, and a third network interface card (NIC 3) that provides a stealth network connection 144 to the switch 114.

An administrator within the organization is able to configure the USB dock 112 using an appropriate configuration software module (admin software) that is installed on a dedicated system within the computing network 118, such as the system hosting Directory Services. For purposes of configuring the USB dock 112, the configuration software is installed on the USB dock 112 from the dedicated system within the computing network 118 via the private connection 152 to the switch 114 and via the private connection 142 between the switch 114 and the first network interface card (NIC 1) within the USB dock 112. Once the configuration software is installed on the USB dock 112, the configuration software is invoked, and an appropriate user input console is displayed on the screen 130. The administrator uses the user input console to configure the second network interface card (NIC 2), which is connected to the computing network 118 via the public network connection 116.

Using the user input console, the administrator also can enable or disable one or more of the antivirus programs embedded within the USB dock 112, as required. The administrator also can enforce a dual scan, which means that a first virus scan can be performed using the F-Prot antivirus program (or other suitable antivirus program) installed on the USB dock 112 and, once the first scan is completed, a second scan can be performed using an antivirus program used within the organization. For example, the administrator can pull the F-Prot antivirus definitions through the computing network 118 and then push the F-Prot antivirus definitions to the USB dock 112 using the private network connections 152, 142. This function can be performed periodically, e.g., on a monthly basis, or as new releases of the F-Prot definitions occur. Also, an automatic check of the latest F-Prot definitions can be performed.

The administrator also can use the user input console to enable or disable the Stealth component 132. Enabling the Stealth component 132 from the user input console is subject to the availability of the Stealth network.

The configuration software also works as a policy engine. The functionality of the configuration software as a policy engine will be discussed in greater detail hereinbelow.

The dedicated system within the computing network 118 also can have installed thereon a lightweight software module (USB browser agent), as will be discussed in greater detail hereinbelow.

Using the configuration software, the USB dock 112 can be configured in any suitable manner. For example, using the configuration software, the USB dock 112 can be configured to stop functioning if more than one instance of the configuration software is found within the computing network 118.

Each USB port 128 on the USB dock 112 has a hard coded unique identification number, which is learned by the operating system 127 of the USB dock 112 when the USB dock 112 is booted. When a USB device is connected to the USB dock 112, a message appears on the screen 130 indicating the size of the USB device and the USB port to which the USB device is connected. The screen 130 then can prompt the user for various information.

For example, the user can be asked if the USB device is to be formatted. If the user desires the USB device to be formatted, the screen 130 prompts the user for a volume label, which the user can enter via the keypad 129. The user then is asked for a domain user identification and password, which the user can enter via the keypad 129. If the user does not desire the USB device to be formatted, the screen 130 prompts the user for a domain user identification and password, which the user can enter via the keypad 129.

If the user enters an inappropriate or incorrect domain user identification and/or password, the USB dock 112 shuts down or disables the USB port 128 to which the USB device is connected. Once the user has entered an appropriate domain user identification and password, the user is asked if the user desires a Stealth application to be enabled. If the user desires a Stealth application to be enabled, the user responds by entering "Y" (yes). If the user does not desire to enable a Stealth application, the user responds by entering "N" (no).

Once the user has entered an appropriate domain user identification and password, and either enabled or not enabled a Stealth application, the USB dock 112 creates the USB mapping table 131 within a memory portion of the USB dock 112, cataloging various information about the USB device and the user. Such information can include the volume label, the serial number of the USB device, the domain identification of the user, and the USB port 128 to which the USB device is connected. The size of the USB mapping table 131 grows based on the number of USB devices that are connected to the USB dock 112. The size of the USB mapping table 131 can be limited to the number of USB ports 128 on the USB dock 112.

Once a user/USB device entry has been entered into the USB mapping table 131, the USB dock 112 initiates an antivirus scan of the USB device connected to the USB dock 112. Based on how the USB dock 112 is configured (e.g., if a dual scan is enabled), the USB dock 112 performs the first scan using F-Prot (or other suitable antivirus program) installed on the USB dock 112. The particular operating system of the USB dock 112 typically uses VFS (virtual file system/virtual file system switch), which assists the USB dock 112 in understanding the file system on the USB device that is connected to the USB dock 112. The use of VFS makes the scan easier, irrespective of the file system on the USB device connected to the USB dock 112.

If the USB dock 112 is configured to perform a dual scan, once the first scan is completed, the configuration software creates a virtual drive with the contents of the USB device connected to the USB dock 112. The virtual drive is created on the system where the configuration software is installed. Obtaining the contents of the USB device for storage on the virtual drive is assisted by the use of VFS. Once the virtual drive is created, the contents on the virtual drive is scanned using the antivirus client installed on the system.

During the antivirus scan, there are two possibilities. First, if a virus is found to exist on the connected USB device, the USB dock 112 generates a message to the user indicating that the user is logged on and that a virus has been detected on the USB device that the user connected to the USB dock 112. The message also can be sent to the appropriate location within the computing network 118, via the switch 114.

The USB dock 112 then asks the user if the user desires the detected virus to be cleaned from the connected USB device. If the user responds "Y" (yes), indicating that the user desires the detected virus to be cleaned from the connected USB device, the USB dock 112 initiates a process of cleaning the detected virus from the connected USB device. Once the detected virus has been cleaned from the connected USB device, the USB dock 112 initiates a token/certificate generating process, which is described hereinbelow.

If the virus can be cleaned from the connected USB device only by deleting one or more infected files on the connected USB device, the USB dock 112 generates a message to the user indicating that one or more infected files must be deleted from the connected USB device. The USB dock 112 also asks the user if the user desires the infected files to be deleted from the connected USB device. If the user responds "Y" (yes), indicating that the user desires the infected files to be deleted from the connected USB device, the USB dock 112 deletes the infected files from the connected USB device. On occasion, if a detected virus is a boot sector virus, the USB dock 112 generates a message asking the user to re-format the USB device. Once the infected files have been deleted from the connected USB device, the USB dock 112 imitates the token/certificate generating process, which is described hereinbelow.

If at any time during the antivirus detecting/cleaning/deleting process the user responds "N" (no), indicating that the user does not want the detected virus to be cleaned or the infected files to be deleted, the USB dock 112 generates a message to the user indicating that the connected USB device does not comply with organizational policy. The USB dock 112 then generates a message to the user asking the user to disconnect the USB device from the USB port 112. The USB dock 112 then shuts down or disables the port 128 to which the USB device is connected, thereby preventing the detected virus from entering the computing network 118.

The second possibility is that no virus is detected. If no virus is detected on the USB device connected to the USB dock 112, the USB dock 112 imitates a token/certificate generating process, as described hereinbelow.

It should be noted that these communications from the USB dock 112 occur with the assistance of the admin software. Although the USB dock 112 communicates to the system that a user is logged on, such communication occurs with the assistance of the admin software. The USB dock 112 communicates such information to the admin software through the private network connection 142, and the admin software verifies the user by checking with the active directory (AD) 120. Once the user has been verified, the admin software, with the assistance of the active directory 120, sends one or more appropriate messages through the building's local area network (LAN) to the respective user (via the USB dock 112).

Once the USB dock 112 has determined that the connected USB device is free of viruses, or has been cleaned/cleared of any detected viruses, the USB dock 112 generates a token or certificate that is associated with the connected USB device, and makes an appropriate entry into the USB mapping table 131. The generated token/certificate is provided to certify that the connected USB device is free from any viruses. The generated token/certificate is valid for a period of time, e.g., 24 hours. Once the token/certificate has expired, the USB dock 112 shuts down or disables the USB port 128 to which the USB device is connected.

Once the USB dock 112 has generated the token/certificate, the USB dock 112 informs the admin software, which also functions as a policy engine, that a token/certificate has been generated for the associated USB device connected to the USB dock 112. The policy engine portion of the admin software then reads the credentials from the AD to see if the user is a privileged user within the organization, such as a director, a vice-president, or an executive officer. Privileged users within the organization are determined based on corporate decisions by the organization, and appropriate entries identifying privileged users are made in the active directory 120. If the user is determined to be a privileged user within the organization, the USB browser agent generates an appropriate icon within the task bar or other appropriate screen location of the user's system. When the user clicks on the icon, a browser or other appropriate application is initiated, which allows the privileged user to access the files on the connected USB device.

If the user is determined to be a non-privileged user within the organization, the non-privileged user is subject to a whitelist of approved file types that the non-privileged user can access from the connected USB device. The non-privileged user is not able to access files from the connected USB device that could be hidden carriers of a virus, such as macros and flash memory files. The non-privileged user is able to access only file types that are considered to be safe, such as files with a .doc, .docx, .html, .xls, .xlsx, .jpg, .gif, or .pdf file extension. If the USB dock 112 discovers files on the connected USB device with file extensions other than the whitelist-approved file extensions, the USB dock 112 severs the connection with the user system, releasing the USB port 128 on the USB dock 112, and invalidating the token/certificate associated with the connected USB device.

If there is a situation in which macro, flash or other potentially harmful files need to be included on the whitelist of approved files, those files first need to be digitally signed using a digital signature issued by an appropriate corporate entity within the organization. Any such digitally signed file would be recognized by the USB dock 112 and the admin software (policy engine), and thus the USB dock 112 would allow the connection with the user system to remain active. The USB browser agent then would generate an appropriate icon within the task bar or other appropriate screen location of the user's system. When the user clicks on the icon, a browser or other appropriate application is initiated, which allows the non-privileged user to access the whitelisted files on the connected USB device.

Connectivity with the USB dock 112 occurs via the second network interface card (NIC 2), which provides the public network connection 116 to the switch 114. The second network interface card (NIC 2) only has communication channels opened to the port 128 to which the USB device is connected and the user system based on instructions and shared commands received from the client operating system.

When the user is finished using the connected USB, and disconnects the connected USB device from the USB dock 112, the USB dock 112 acknowledges that the USB device has been disconnected from the USB dock 112. The USB dock 112 then removes or invalidates the token/certificate associated with the disconnected USB device, and shuts down or disables the USB port 128 on the USB dock 112.

As discussed hereinabove, as part of the initial user identification procedure, the user can choose to enable one or more Stealth applications. As discussed hereinabove, the USB docks 12, 112 each includes one or more embedded Stealth application components 32, 132, respectively. Alternatively, one or more Stealth application components can be coupled to the USB docks 12, 112. Also, the computing networks 18, 118 each includes one or more embedded Stealth application components 36, 136, respectively. Alternatively, one or more Stealth application components can be coupled to the computing networks 18, 118.

The Stealth application components include Stealth technology developed by Unisys Corporation of Blue Bell, Pa. In general, Stealth technology conceals communication endpoints in such a way that makes the endpoints undetectable to unauthorized parties inside and outside of the particular platform in which the Stealth application component resides. Therefore, by embedding the Stealth application components 32, 132 into the USB docks 12, 112, respectively, the communication endpoints of the USB docks 12, 112 are undetectable from the perspective of the computing networks 18, 118, respectively, and the computing devices 24, 124, respectively.

When the user chooses to enable the Stealth application, the Stealth component 32, 132, within the USB dock 12, 112, respectively, becomes active. Upon activation of the Stealth component, the USB dock enters into the USB mapping table 31, 131 a pattern or entry that distinguishes the USB port to which the USB device is connected from other (non-Stealth) ports. The Stealth component then establishes a connection with the Stealth component 36, 136 within the computing network 18, 118.

Based on user permissions, and with reference to the active directory 20, 120 within the computing network 18, 118, respectively, the connected USB device is brought into the appropriate Stealth community of interest. Therefore, once the virus scanning/cleaning/deleting process and the token/certificate generating process have been completed, and a new drive has been opened on the computing device 24, 124, the user is provided with a notification that Stealth endpoint protection status has been enabled for the specific port to which the USB device is connected. The user is the only one who will know that Stealth endpoint protection status is enabled for the specific port to which the USB device is connected.

According to an embodiment, the USB dock 112 is configurable. For example, the USB dock 112 can be configured in such a way that the same user can connect and use multiple USB devices on the same USB dock 112 and same computing network 118. Alternatively, the USB dock 112 can be configured in such a way that a user can connect only one USB device to the USB dock 112 at any given time. The USB dock 112 and/or the computing network 118 includes a configuration window, with a filtering option, for setting various configurations for the USB dock 112. The filtering can be performed based on the domain user identification, or a combination of the domain user identification and the serial number of the USB device. The configuration for the USB dock 112 typically is set according to the particular policy of the organization.

Figure 3:
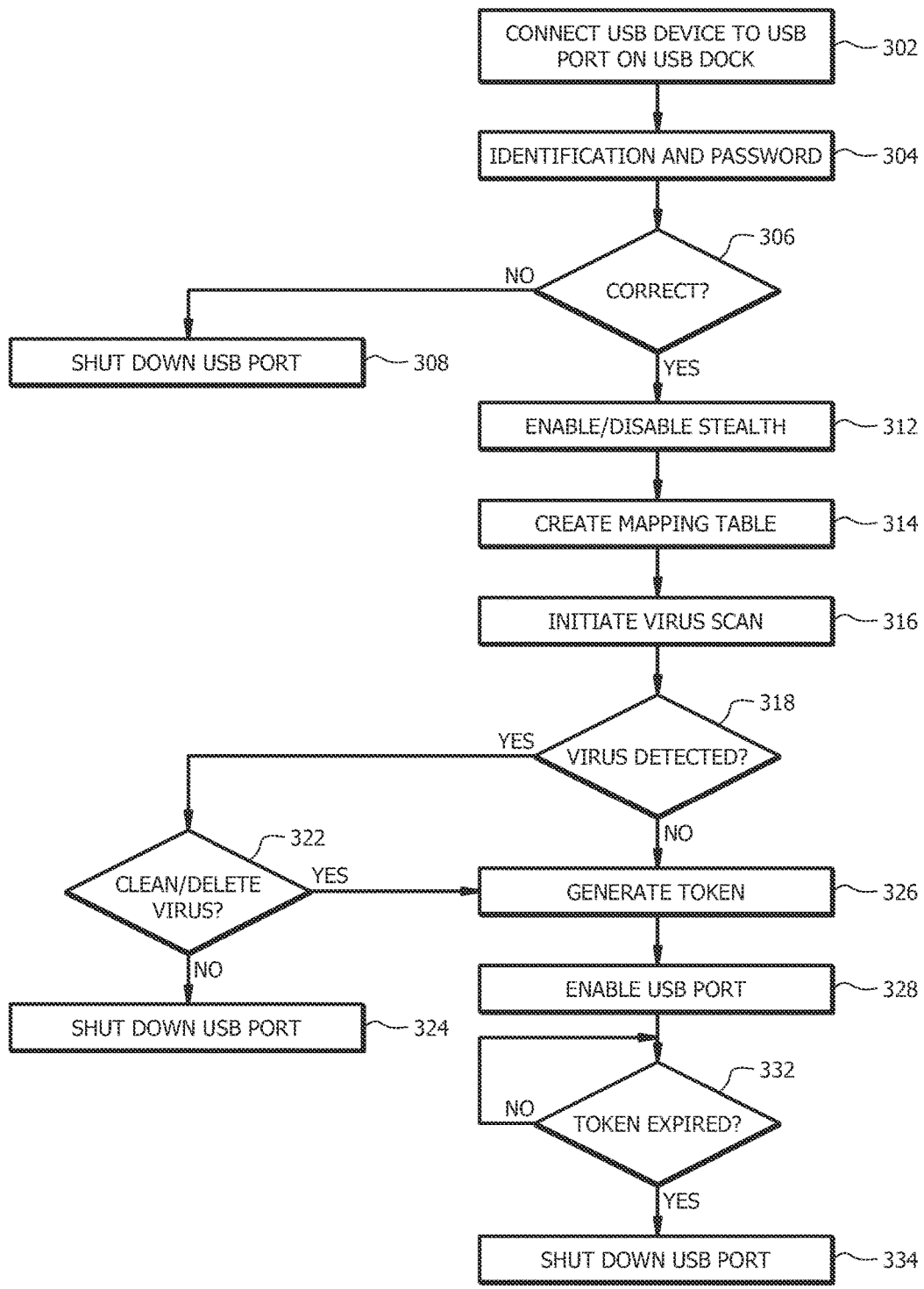
FIG. 3 is a flow diagram of a method for securely connecting a USB device to a computing network, according to an embodiment.

FIG. 3 is a flow diagram of a method 300 for securely connecting a USB device to a computing network, according to an embodiment. The method 300 includes a step 302 of connecting the USB data storage device to the USB dock. As discussed hereinabove, the USB data storage device is connected to one of the USB ports on the USB dock. When the USB data storage device is connected to the USB dock, the USB dock indicates the size of the USB data storage device and the USB port to which the USB data storage device is connected.

The method 300 also includes a step 304 of prompting the user of the connected USB data storage device for a domain user identification and password. As discussed hereinabove, a screen on the USB dock prompts the user of the connected USB data storage device for their domain user identification and password. The user of the connected USB data storage device enters the domain user identification and password via the keypad on the USB dock.

The method 300 also includes a step 306 of determining whether the domain user identification and password entered by the user of the USB data storage device are correct, i.e., if the domain user identification is a proper domain user identification and if the password matches the domain user identification. If the domain user identification is an improper domain user identification, or if the password does not match the domain user identification ("NO"), the method includes a step 308 of shutting down or disabling the USB port to which the USB data storage device is connected.

If the domain user identification is a proper domain user identification, and if the password matches the domain user identification, the method 300 proceeds to a step 312 of asking the user of the USB data storage device if they desire a Stealth application to be enabled. Depending on the user's response, one or more Stealth applications are enabled or not enabled.

The method also includes a step 314 of creating a table. As discussed hereinabove, the USB dock creates a table within a memory portion of the USB dock that catalogues various information about the USB data storage device and the user. Such information can include the volume label, the serial number of the USB data storage device, the domain identification of the user, and the USB port to which the USB data storage device is connected.

The method also includes a step 316 of initiating at least one antivirus scan of the connected USB data storage device. As discussed hereinabove, the USB dock can perform a single antivirus scan or a dual antivirus scan. The method 300 includes a step 318 of determining whether a virus has been detected on the connected USB data storage device. If the antivirus scan detects a virus on the connected USB data storage device ("YES"), the method 300 proceeds to a step 322 of asking the user of the connected USB data storage device if the user wants the detected virus to be cleaned (or in some cases removed or deleted) from the connected USB device. If the user does not want the detected virus to be cleaned or removed from the connected USB data storage device ("NO"), the method 300 executes a step 324 of shutting down or disabling the USB port to which the USB data storage device is connected, thereby preventing the detected virus from entering the computing network to which the USB dock is coupled.

If the user does want the detected virus to be cleaned or removed from the connected USB data storage device ("YES"), the USB dock initiates a process of cleaning (or removing) the detected virus from the connected USB data storage device. Once the detected virus has been cleaned (or removed) from the connected USB data storage device, the method 300 proceeds to a step 326 of generating a token/certificate that is associated with the connected USB data storage device. As discussed hereinabove, the generated token/certificate is provided to certify that the connected USB data storage device is free from any viruses. Also, the generated token/certificate is valid for a period of time, e.g., 24 hours.

The method also includes a step 328 of enabling the USB port to which the USB data storage device is connected. As discussed hereinabove, once the USB dock has generated the token/certificate, the USB dock sends a background request to the computing network, indicating the laptop or desktop computing device to which the user is logged on. The computing network then establishes a new drive on the laptop or desktop computing device to which the user is logged on. The user sees a new window opened on the laptop or desktop computing device, and the user now is free to access the connected USB data storage device through this window on the laptop or desktop computing device.

The method also includes a step 332 of determining if the generated token/certificate is expired. As discussed hereinabove, the generated token/certificate is valid for a period of time, e.g., 24 hours. As long as the generated token/certificate is not expired ("NO"), the USB port to which the USB data storage device is connected will continue to be enabled. If the generated token/certificate is expired ("YES"), the method 300 executes a step 334 of shutting down or disabling the USB port to which the USB data storage device is connected.

It will be apparent to those skilled in the art that many changes and substitutions can be made to the embodiments described herein without departing from the spirit and scope of the disclosure as defined by the appended claims and their full scope of equivalents.

The invention claimed is:

1. A Universal Serial Bus (USB) dock for connecting a USB data storage device to a computing network, the USB dock comprising:
   a chassis for coupling the USB dock to the computing network;
   at least one panel coupled to the chassis;
   at least one USB port coupled to at least one of the panels, wherein the at least one USB port is configured to couple a USB data storage device to the USB dock, wherein the at least one USB port indicates when a USB data storage device is connected to the USB port; and
   an operating system within the USB dock for booting the USB dock, for creating a table associated with a USB data storage device connected to the USB port, wherein the table identifies the USB data storage device connected to the USB port and the USB port to which the USB data storage device is connected, and for initiating an antivirus scan of the USB data storage device connected to the USB port,
   wherein, if the antivirus scan detects a virus on the USB data storage device connected to the USB port, an option of removing the virus from the USB data storage device connected to the USB port is provided,
   wherein, if the detected virus is not removed from the USB data storage device, the USB port to which the USB data storage device is connected is disabled thereby preventing the virus from entering the computing network,
   wherein, if the detected virus is removed from the USB data storage device, the operating system generates a token associated with the USB port to which the USB data storage device is connected and stores the token in the table, wherein the token allows for enablement of the USB port to which the USB data storage device is connected, and
   wherein, when the token expires, the USB port to which the USB data storage device is connected is disabled thereby preventing enablement of the USB port to which the USB data storage device is connected.

2. The USB dock as recited in claim 1, wherein the USB dock includes a management USB port for coupling the USB dock to a computing network via a switch and at least one network connection, wherein the switch and the at least one network connection are external to the USB dock.

3. The USB dock as recited in claim 1, wherein, prior to initiating the antivirus scan, the USB dock prompts a user of the USB data storage device connected to the USB port to enter a user identification and a password.

4. The USB dock as recited in claim 3, wherein, if an incorrect user identification or password is entered, the USB port to which the USB data storage device is connected is disabled thereby preventing enablement of the USB port to which the USB data storage device is connected.

5. The USB dock as recited in claim 1, wherein the generated token is valid for a period of time.

6. The USB dock as recited in claim 1, wherein the USB dock includes at least one Stealth component for concealing at least one communication endpoint of the USB dock from the computing network and from any computing devices coupled to the USB dock.

7. The USB dock as recited in claim 1, wherein the table includes at least one of the volume label of a USB data storage device connected to the USB port, the serial number of the USB data storage device connected to the USB port, and the USB port to which the USB data storage device is connected.

8. The USB dock as recited in claim 1, wherein the USB dock includes a keypad and a screen for allowing a user to interface with the USB dock.

9. The USB dock as recited in claim 1, wherein the USB dock is configured via a computing device coupled to the USB dock.

10. The USB dock as recited in claim 1, wherein the USB data storage device includes one of a USB memory stick, a USB pen drive and an external hard disk drive.

11. A system for connecting a USB data storage device to a computing network, the system comprising:
   a USB dock having at least one panel with at least one USB port; and
   a switch coupled to the USB dock for coupling the USB dock to the computing network and for coupling the USB dock to a user computing device,
   wherein the at least one USB port is configured to couple a USB data storage device to the USB dock, wherein the at least one USB port indicates when a USB data storage device is connected to the USB port,
   wherein the USB dock includes an operating system for booting the USB dock, for creating a table associated with a USB data storage device connected to the USB port, wherein the table identifies the USB data storage device connected to the USB port and the USB port to which the USB data storage device is connected, and for initiating an antivirus scan of the USB data storage device connected to the USB port, wherein, if the antivirus scan detects a virus on the USB data storage device connected to the USB port, an option of removing the virus from the USB data storage device connected to the USB port is provided, wherein, if the detected virus is not removed from the USB data storage device, the USB port to which the USB data storage device is connected is disabled thereby preventing the virus from entering the computing network, wherein, if the detected virus is removed from the USB data storage device, the operating system generates a token associated with the USB port to which the USB data storage device is connected and stores the token in the table, wherein the token allows for enablement of the USB port to which the USB data storage device is connected, and wherein, when the token expires, the USB port to which the USB data storage device is connected is disabled thereby preventing enablement of the USB port to which the USB data storage device is connected.

12. The system as recited in claim 11, wherein the USB dock includes a management USB port for coupling the USB dock to the computing network via the switch and at least one network connection, wherein the switch and the at least one network connection are external to the USB dock.

13. The system as recited in claim 11, wherein, prior to initiating the antivirus scan, the USB dock prompts a user of the USB data storage device connected to the USB port to enter a user identification and a password.

14. The system as recited in claim 13, wherein, if an incorrect user identification or password is entered, the USB port to which the USB data storage device is connected is disabled thereby preventing enablement of the USB port to which the USB data storage device is connected.

15. The system as recited in claim 11, wherein the USB dock initiates a first antivirus scan using an antivirus program embedded within the USB dock and a second antivirus scan using an antivirus program downloaded from the computing network.

16. The system as recited in claim 11, wherein the USB dock includes at least one Stealth component for concealing at least one communication endpoint of the USB dock from the computing network and from any computing devices coupled to the USB dock.

17. The system as recited in claim 11, wherein the USB dock is connected to the switch via at least one network interface card (NIC).

18. A method for connecting a Universal Serial Bus (USB) data storage device to a computing network, the method comprising:

connecting the USB data storage device to a USB dock having at least one USB port;

creating a table associated with the USB data storage device connected to the USB port, wherein the table identifies the USB data storage device connected to the USB port and the USB port to which the USB data storage device is connected;

initiating at least one antivirus scan of the USB data storage device connected to the USB port, if the antivirus scan detects a virus on the USB data storage device connected to the USB port, providing an option of removing the virus from the USB data storage device connected to the USB port;

if the detected virus is not removed from the USB data storage device, disabling the USB port to which the USB data storage device is connected thereby preventing the virus from entering the computing network, if the detected virus is removed from the USB data storage device, generating a token associated with the USB port to which the USB data storage device is connected and storing the token in the table, wherein the token allows for enablement of the USB port to which the USB data storage device is connected, and when the token expires, disabling the USB port to which the USB data storage device is connected thereby preventing enablement of the USB port to which the USB data storage device is connected.

19. The method as recited in claim 18, wherein the method further comprises, prior to initiating the antivirus scan, prompting a user of the USB data storage device connected to the USB port to enter a user identification and a password.

20. The method as recited in claim 19, wherein, if an incorrect user identification or password is entered, disabling the USB port to which the USB data storage device is connected thereby preventing enablement of the USB port to which the USB data storage device is connected.

21. The method as recited in claim 18, wherein the method further comprises, prior to initiating the antivirus scan, prompting a user of the USB data storage device connected to the USB port to enable or disable a Stealth component, wherein the Stealth component conceals at least one communication endpoint of the USB dock from the computing network and from any computing devices coupled to the USB dock.

22. The method as recited in claim 18, generating a token associated with the USB port to which the USB data storage device is connected further comprises validating the token for a period of time.

* * * * *